United States Patent [19]
Christopher

[11] Patent Number: 6,102,478
[45] Date of Patent: Aug. 15, 2000

[54] VEHICLE SEAT SLIDE MECHANISM

[75] Inventor: Hugh Charles Christopher, West Bridgport, United Kingdom

[73] Assignee: Lear Corporation, Southfield, Mich.

[21] Appl. No.: 09/008,436

[22] Filed: Jan. 16, 1998

[51] Int. Cl.[7] .................................................. B60N 2/04
[52] U.S. Cl. ........................................ 297/341; 248/429
[58] Field of Search ........................... 297/341; 248/429, 248/430

[56] References Cited

U.S. PATENT DOCUMENTS

| | | | |
|---|---|---|---|
| 3,981,473 | 9/1976 | Nagai | 248/430 |
| 4,101,169 | 7/1978 | Muraishi et al. | 297/341 |
| 4,639,038 | 1/1987 | Heling | 297/341 |
| 4,648,657 | 3/1987 | Cox et al. | 297/341 |
| 4,881,774 | 11/1989 | Bradley et al. | 297/341 |
| 5,020,853 | 6/1991 | Babbs | 297/341 |
| 5,273,241 | 12/1993 | Droulon | |
| 5,407,165 | 4/1995 | Balocke | |
| 5,605,377 | 2/1997 | Tame | 297/341 |
| 5,688,026 | 11/1997 | Reubeuze et al. | 297/341 |

*Primary Examiner*—Ramon O. Ramirez
*Assistant Examiner*—Stephen S. Wentsler
*Attorney, Agent, or Firm*—Brooks & Kushman P.C.

[57] ABSTRACT

A vehicle seat slide mechanism has an upper rail provided with a pawl which holds an engagement member in a position where a trigger is disengaged from a lower rail while an upper rail is moved forwardly. A memory member comprises a front surface, a ramp surface, and a slot engageable by the engagement member in the form of a pin, whereby on rearward movement of the upper rail, the pawl engages the front surface and releases the pin which is moved along the ramp surface and into the slot.

8 Claims, 3 Drawing Sheets

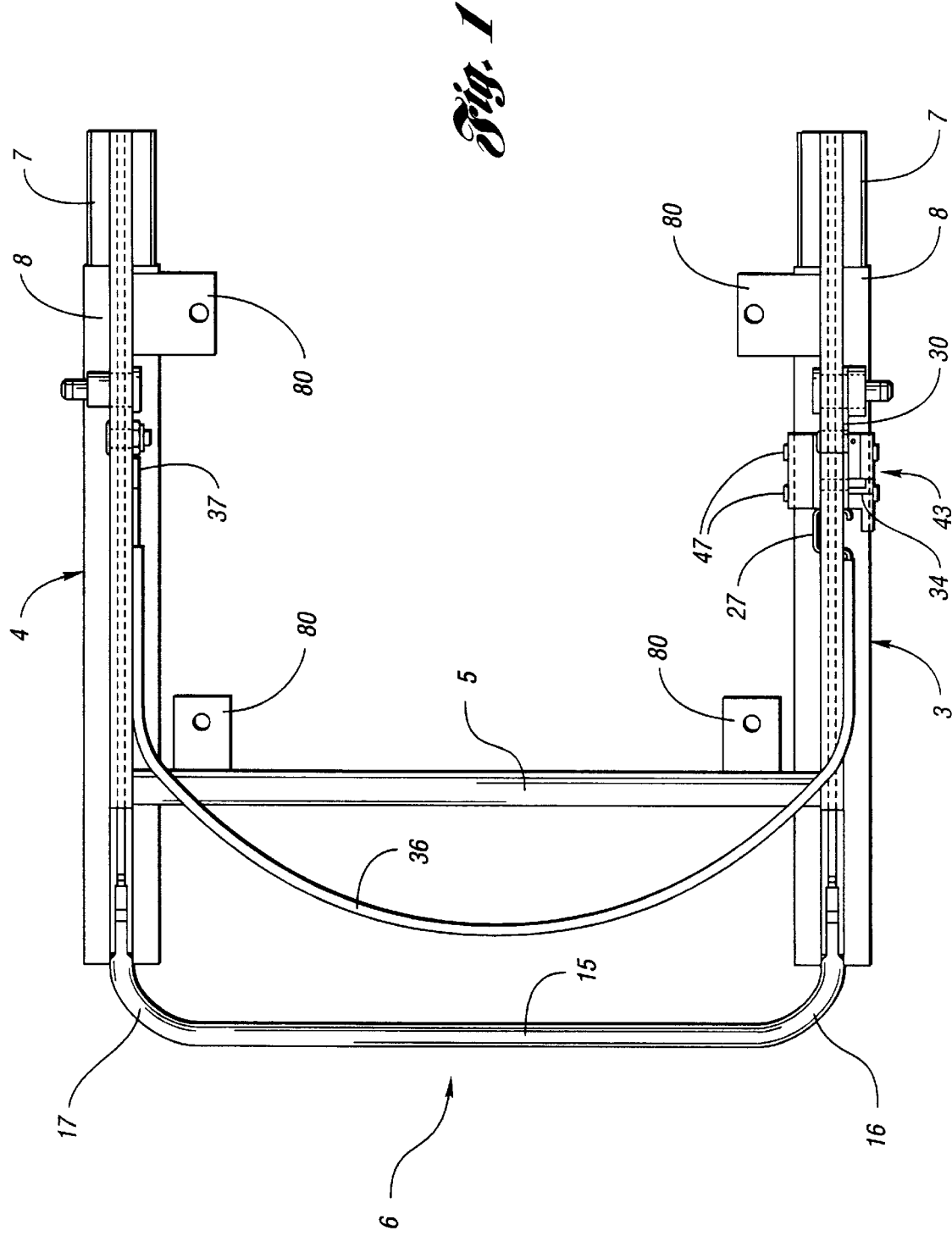

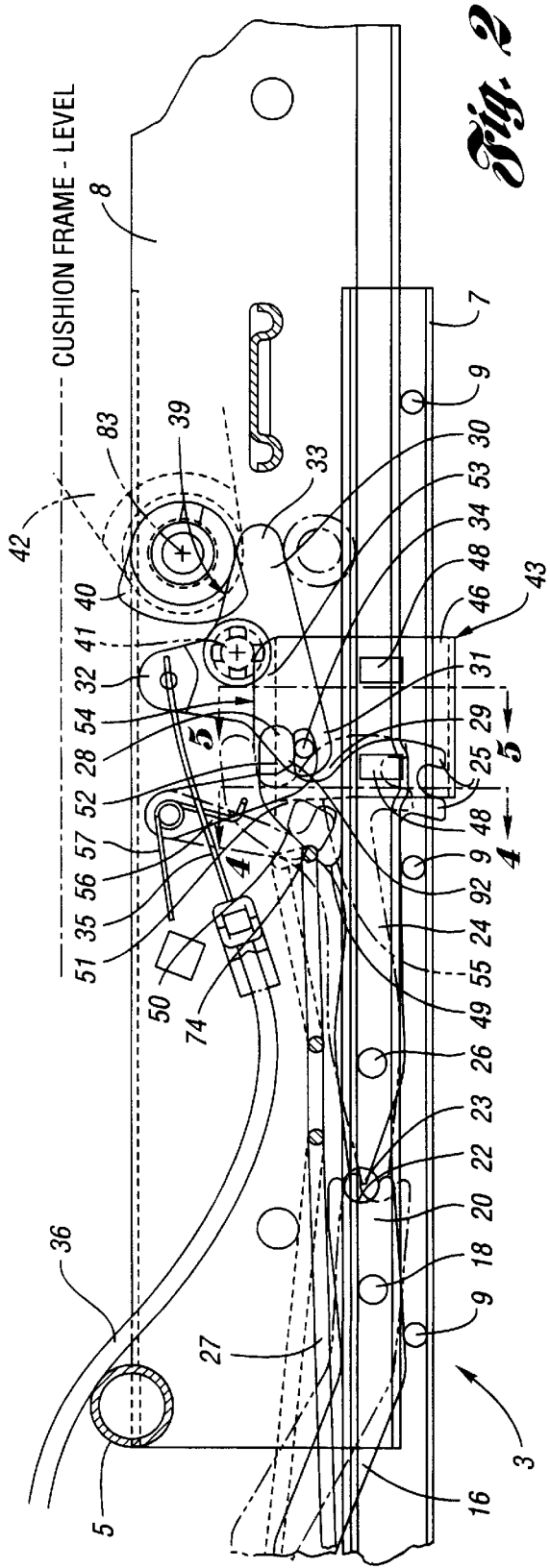
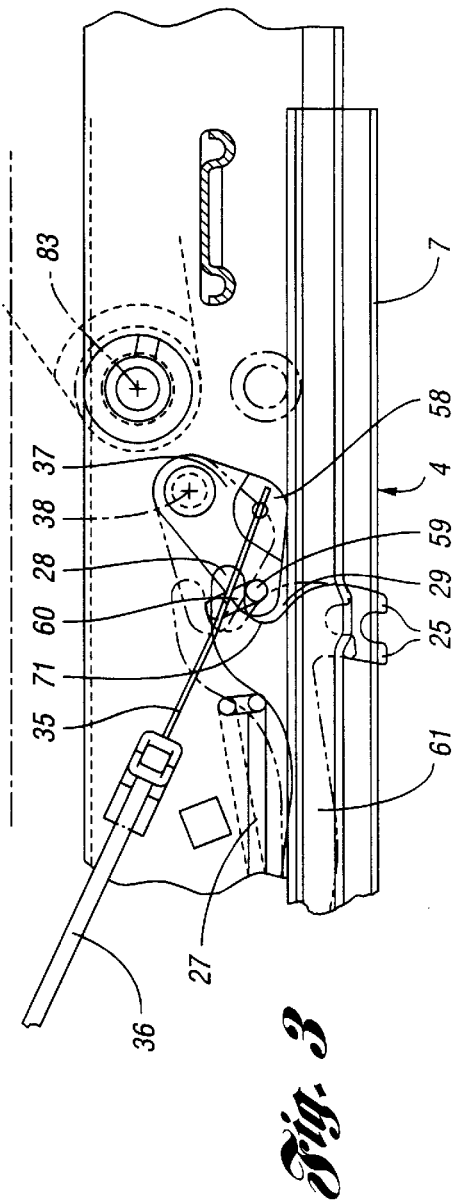

VEHICLE SEAT SLIDE MECHANISM

TECHNICAL FIELD

This invention relates to a vehicle seat slide mechanism.

BACKGROUND OF THE INVENTION

Conventionally, a seat slide mechanism comprises two seat slides, one on each side of the vehicle seat, each seat slide comprises a lower rail adapted to be fixed to the vehicle floor and an upper rail adapted to carry the seat. Each upper rail is capable of movement in a fore-and-aft direction relative to the lower rail. A locking mechanism is further provided for securing the upper rail and seat in the desired position with respect to the lower rail and the vehicle floor, the locking mechanism being releasable normally by a handle to allow any required adjustment of the fore-and-aft position.

It is also known, particularly in the case of two-door vehicles, to provide the front seat slide with a memory system, operable by a suitable lever, e.g. comprising the seat squab, which overrides the locking mechanism, thus allowing the front seat to be moved forward and providing easy access for a person to a rear seat. The same memory system is also operable on returning the seat squab to its upright position to enable the seat to be moved back to its original position as previously set by the front seat occupant.

However, some such systems are relatively complicated and therefore expensive to manufacture. Some systems suffer from the disadvantages that they sometimes operate incorrectly or out of sequence. Examples of such systems are disclosed in U.S. Pat. No. 4881774 and EP-A-0411850, the latter publication disclosing a vehicle seat slide mechanism.

SUMMARY OF THE INVENTION

It is an object of the present invention to provide a vehicle seat slide mechanism which does not suffer from the above disadvantages.

In accordance with the invention, a vehicle seat slide mechanism comprises two seat slides, each consisting of an upper rail adapted to carry the vehicle seat and a lower rail associated therewith and adapted to be connected to the vehicle floor, each upper rail being capable of movement in a fore-and-aft direction relative to the associated lower rail, a trigger mounted on at least one upper rail and normally urged by biasing means into a locked position in engagement with at least one of a series of apertures or notches in the associated lower rail to prevent relative movement of the upper rail with respect to the lower rail, a release member cooperating with the trigger and arranged to move the trigger from the locked position to an unlocked position out of engagement with the at least one aperture or notch in the lower rail, a memory member carried by the lower rail of one of the two slides and movable parallel thereto by engagement with an engagement member carried by the upper rail of the same slide, a lever operable to disengage the engagement member from the memory member and to move the trigger out of engagement with the associated lower rail to allow forward movement of the upper rail and seat thereon, the memory member remaining in position on the lower rail, the upper rail being provided with a pawl which holds the engagement member in the position where the trigger is disengaged from the lower rail while the upper rail is moved forwardly and the memory member comprises a front surface, a ramp surface and a slot engageable by the engagement member in the form of a pin, whereby on rearward movement of the upper rail, the pawl engages the front surface and releases the pin which is moved along the ramp surface and into the slot.

Preferably, the biasing means comprises spring means.

On the rearward movement of the upper rail, the pawl may release the engagement member in the form of a pin allowing the trigger to return to the locked position.

In one particular form of the invention, the lever comprises the seat squab, a side plate of which has a cam which is engageable with a surface on a latch on one side of the two slides and which carries the engagement member in the form of a pin. The latch is linked, e.g. by means of a flexible cable, to a plate on the other of the two slides and which also carries an engagement member in the form of a pin. Movement of the squab in a forward direction operates the latch and the plate linked thereto to cause the two pins to move the respective triggers, one on each slide, out of engagement with the two lower rails. The memory member is in the form of a block frictionally engaged with but slidable on the lower rail of the slide having the latch, the pin on the latch normally being engaged in a slot in the block to cause it to move with the upper rail so long as the seat squab is not tilted forwardly. Forward tilting of the squab causes the pin to move out of the slot and the member remains in position until re-engaged by the pawl.

One embodiment of the invention will now be described by way of example only with reference to the accompanying drawings.

BRIEF DESCRIPTION OF THE DRAWINGS

FIG. 1 shows a diagrammatic plan view of a vehicle seat base including two seat slides, some parts being omitted for clarity;

FIG. 2 shows a partial side view, partial longitudinal sectional view of a first of the two seat slides shown in FIG. 1;

FIG. 3 shows a partial side view, partial longitudinal sectional view of the second seat slide shown in FIG. 1;

DETAILED DESCRIPTION OF THE PREFERRED EMBODIMENT

Figure 4:
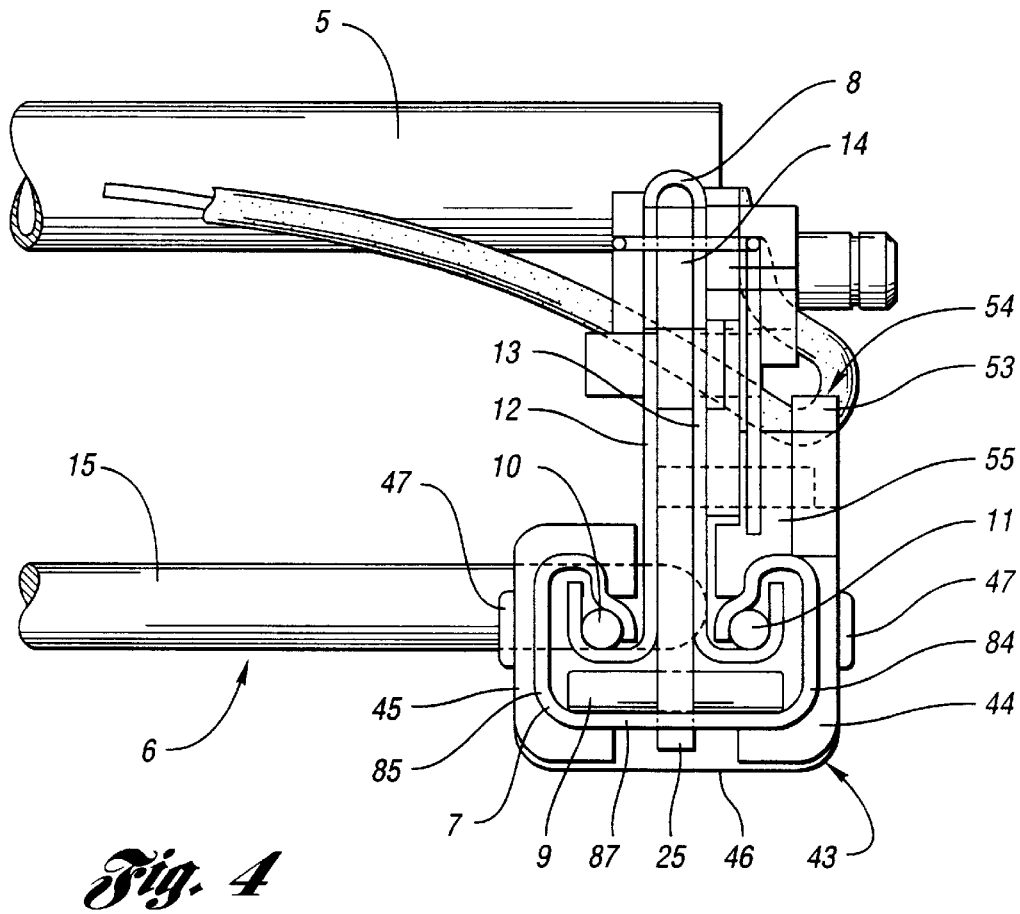
FIG. 4 shows a part front view, part cross-sectional view of the first slide shown in FIG. 2.

The seat base comprises two parallel seat slides 3,4 and a handle 6 for actuating the locking mechanism, extending across the front of the seat base.

Each slide comprises a lower rail 7 for fixing to the vehicle floor and an upper rail 8 for carrying the vehicle seat. The type of slide is not important to the invention but the one illustrated is described more fully in EP-A-076041. It comprises a U-shaped lower rail in which a plurality of spaced apart rollers 9 are positioned and an inverted T-shaped upper rail 8, the head of the T resting on the rollers 9. The edges of the U-shaped lower rail are bent inward to provide ball races for two rows of balls 10,11 which position the upper rail 8 accurately with respect to the lower rail 7. The upper rail 8 is made from a single sheet of mild steel bent to the required configuration and the stem of the T comprises two spaced-apart side portions 12,13 of the sheet, thus forming an elongated cavity 14 as can be seen clearly in FIG. 4.

The upper rails are joined by a tubular bracing member 5 and brackets 80 are provided on the upper rails and bracing member for supporting the seat.

Attached to the upper rails 8 is a large handle 6 consisting of a horizontal bar 15 extending across the front of the base, and which, in use, will be positioned over the front edge of the seat, and two side arms 16,17, one arm 16 being mounted on a horizontal pivot 18 on the upper rail 8 of the first slide 3 (see FIG. 2) and the other mounted on a pivot (not shown) on the upper rail 8 of the second slide 4. The pivots are coaxial and their common axis is parallel to the bar 15. The pivots each extend across the cavity 14 defined by the two side portions 12,13 of the respective rail 8 and part of each arm 16 or 17 is located within the cavity.

Each of the rear ends 20 of the arms stamped from flat mild steel sheet is formed with a generally semi-circular recess 22 within which is located the respective part-circular front end 23 of one or other of the two locking triggers 24,61 which are mounted on horizontal pivots 26 within the respective cavity 14. Each trigger is made by stamping from flat mild steel plate and the rear end of each trigger is formed with two downwardly-pointing teeth 25 which are locatable in two adjacent apertures (not shown) of a plurality of apertures (not shown) spaced-apart along the length of the lower rail 7. Two wire springs 27, one for each slide, are mounted on the upper rail and bias the front bar 15 of the handle 6 and the teeth 25 of the trigger 24 downwardly, the teeth into the apertures in the lower rails. (The downwardly-biased positions are shown in solid lines and other possible positions are shown in dotted outline). Also formed at the rear end of each trigger above the downwardly pointing teeth is a hook-shaped projection 28 defining a recess 29 facing toward the rear of the slide, for a purpose to be described.

Mounted on one side of the upper rail of the first slide 3 on horizontal pivot 41 is a latch 30 having three arms 31, 32 and 33. The latch is also stamped from mild steel plate. Most of the latch 30 is flat and lies parallel and touching the side of a wall portion 13 of the upper rail 8. The first of the arms 31 has a pin 34 secured thereto, so as to extend horizontally and perpendicularly to the plane of the latch 30. The pin projects through and is supported by the sides of two curved slots 52, formed in the two wall portions 12,13 of the upper rail 8. The sides of the slots have a curvature centered on the pivot 41. The pin 34 also projects on the other side of the arm 31 away from the rail. Part of the pin 34 lies inside the cavity 14 between the two portions 12,13 of the upper rail 8 and locates against the underside of the hook-shaped projection 28 and within the recess 29 formed at the rear of the trigger 24. The second arm 32 projects upwardly and is cranked so as to be spaced-away from and parallel to the side of the upper rail 8. One end of a flexible cable 35 is attached to this arm, the cable passing through sheathing 36 to the other slide 4 where the other end of the cable is connected to a generally triangular-shaped slave plate 37, mounted on a horizontal pivot 38 on the upper rail 8 of the said other slide 4. The third arm 33 of the latch 30 projects generally toward the rear of the slide 3 and has an upper surface 39 which engages a cam 40 mounted to rotate about an axis 83 parallel to the latch pivot axis 41. The cam is carried by the associated side plate 42 of the seat squab and rotates as the squab is tilted.

Figure 5:
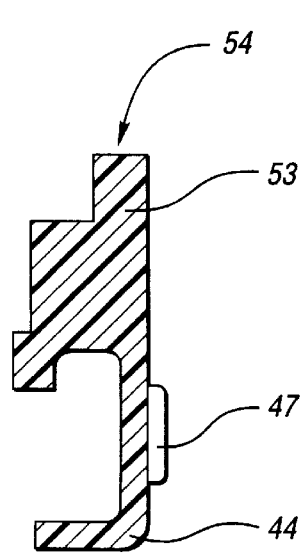
FIG. 5 shows a cross-sectional view through the memory block on line V—V of FIG. 4.
Figure 6:
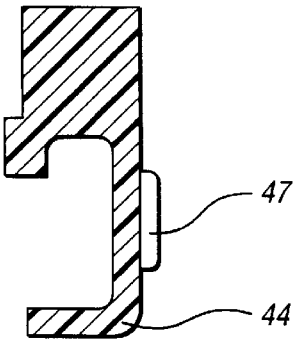
FIG. 6 shows a cross-sectional view through the memory block on line VI—VI of FIG. 4.

As can be seen particularly in FIGS. 4, 5 and 6, slidably mounted on the bottom rail 7 of the one slide 3 is a memory member 43 comprising two shaped plastic, e.g. nylon or polypropylene, blocks 44,45 held in frictional engagement, one on each side of the lower rail 7, by a U-shaped spring 46, the blocks each have two rectangular projections 47 extending outwardly to locate in two pairs of rectangular windows 48 in the spring 46. The inner sides of each block are shaped to clip onto the sides 84,85 and part of the base 87 of the lower rail 7, as can be seen particularly in FIG. 4. One block 44 (located on the right-hand side of FIG. 4) has a forwardly-facing projection 49 with an upper inclined ramp surface 50, as can be seen in FIG. 2. Immediately behind and above the ramp surface 50 is a short horizontal surface 51 which ends at a downwardly- and rearwardly-extending slot 92. Behind the slot, the block is formed with a flange 53 having an upper surface 54 which is also horizontal and at a higher level than the short horizontal surface 51. The rear side surface of the slot 52 is thus longer than the front surface thereof. The upper part 54 of the block is formed so as to be spaced apart from the facing surface of the upper rail sufficient to allow the block to move freely past the lower part of the three-armed latch 30. The flange is spaced a further distance to allow the pivot 41 for the three-armed latch to move freely as required. The block is provided with a front face 55 between the projection 49 and the upper rail which is engageable by a memory pawl 56, as will be described. The other block 45 is not formed with a projection, a flange or an upper part, as can be seen in FIG. 4.

Pivotally mounted on the upper rail so as to be positioned on the same side of the rail as and in front of the three-armed latch 30 and almost vertically above the teeth of the trigger is a memory pawl 56 stamped from sheet mild steel and having a generally L-shaped configuration. The memory pawl has a lower limb 74 extending rearwardly so that the upper surface engages the pin 34 on the three-arm latch as required. The memory pawl 56 is biased by means of a spring 57 in a rearward direction.

The other slide 4 is of similar construction to the first slide 3. However, there is no memory member slidably mounted on the lower rail, no cam attached to the slide plate of the squab, no three-armed latch and no memory pawl. In the equivalent position to the three-armed latch is the generally triangular slave plate 37 mounted by a pivot 38 adjacent one corner thereof on the inboard side of the upper rail. The said other end of the cable 35 is attached adjacent a lower corner 58 of the plate and adjacent the third corner is a pin 59 extending perpendicularly to the plane of the plate and through two short curved slots 60, one in each wall portion 12,13 of the upper rail 8. The curvature of the sides of the slots 60, which support the pin 59 are centered on the pivot axis 38 for the slave plate. The pin 59 engages the underside of the hook-shaped projection 28 at the rear end of the trigger 61 in this second slide 4. As will be appreciated, the slave plate 37 rotates simultaneously with the three-armed latch 30, thus causing the pin 59 and the trigger 61 to move simultaneously with the pin 34 and the trigger 24, respectively.

In operation, if the seat occupant wishes to adjust the position of the seat in the fore-and-aft direction, the front bar 15 of the handle 6 is lifted causing the rear ends of the arms 16,17 and the recess 22 in each to move downward. This causes the triggers 24 and 61 in the respective slides 3 and 4 to pivot, the teeth 25 at the rear end thereof being lifted clear of the apertures in each lower rail 7. The upper rails 8 and the seat mounted thereon may then be moved forward or backward as required. When in the new position, the handle 6 is released and, under the influence of the springs 27 on each slide, the teeth in the triggers move downward into engagement with a pair of apertures in each respective lower rail.

As the seat position is being changed, the memory member 43 on the first slide 3 moves with the upper rail 8 thereof because of the engagement of the pin 34 on the three-armed latch 30 in the slot 52 of the outboard block 44. If, however, the seat squab is tilted forward, the cam 40 on the seat squab side plate 42 rotates in an anti-clockwise direction (as shown in FIG. 2) and by pushing the rearwardly-extending arm 33 downward causes rotation of the three-armed latch 30 in a clockwise direction (as shown in FIG. 2). As mentioned above, because of the connection with the triangular slave plate on the other slide 4 by means of the cable 35, this plate also rotates in a clockwise direction (as shown in FIG. 3). Thus, both the three-armed latch 30 and the triangular slave plate 37 rotate simultaneously. The pins 34 and 59 attached to each are raised in the slots in the upper rails, thus raising the rear end of each trigger by engagement with the underside of the rearwardly-extending projections 28. The trigger teeth 25 are thus lifted out of the apertures in the lower rail 7 and the seat may be moved. Because the pin 34 in the first slide has been raised clear of the slot in the memory member 43, when the seat is moved forward the block remains in position on the lower rail. The pin, now positioned in the upper part of the slot, is carried forward over the horizontal surface 51 and into contact with the memory pawl 56 which has rotated from the position show in dotted outline to that shown in full in FIG. 2 under the effect of the spring 57, so remaining in contact with the front face 55 of the memory block as the upper rail is moved forward. The pin 34 nestles in the crook of the pawl on the upper surface of the limb 74 as the upper rail moves, leaving the memory block 43 in position on the lower rail.

In the seat squab is moved to an upright position while the seat and the upper rail are in the forward position, the trigger teeth will not re-engage the apertures in the lower rail because the trigger is retained in its upper position, as shown in dotted outline in FIG. 2 by the pin held in the crook of the pawl engaging the underside of the projection 28 on the trigger.

When the squab is moved to its normal upright position and the seat and upper rail is moved rearwardly, the pawl 56 will engage the front face 55 of the memory block 43, rotate in a clockwise direction, and allow the pin 34 to move out of the crook along the ramp surface 50 and horizontal surface 51 of the memory member, and engage the slot 52 in front of the flange 53, allowing the pins 34 and 59 to move in the curved slots in each upper rail and pin 34 to move in the slot in the block, to the lower ends thereof. This allows the triggers to move downward and the teeth to engage in the same apertures in the lower rails before the operation began.

The memory system of the vehicle seat slide mechanism of the invention described above is relatively simple in construction and inexpensive to manufacture. It has the advantage that one member, i.e. in the embodiment describing the pin 23 is sued to cause the trigger to be released and to move the memory block to the required position.

In the event of incorrect operation, the position of the seat and memory block may be restored on the next operation of the mechanism. The frictional engagement of the memory block with the lower rail allows it to move to the next engagement position should the trigger pass over an aperture or the seat be moved rearwardly with the squab in the forward-tilted position.

While the best mode for carrying out the invention has been described in detail, those familiar with the art to which this invention relates will recognize various alternative designs and embodiments for practicing the invention as defined by the following claims.

What is claimed is:

1. A vehicle seat slide mechanism comprising two seat slides, each consisting of an upper rail adapted to carry the vehicle seat and a lower rail associated therewith and adapted to be connected to the vehicle floor, each upper rail being capable of movement in a fore-and-aft direction relative to the associated lower rail, a trigger mounted on at least one upper rail and normally urged by biasing means into a locked position in engagement with at least one of a series of apertures or notches in the associated lower rail to prevent relative movement of the upper rail with respect to the lower rail, a release member cooperating with the trigger and arranged to move the trigger from the locked position to an unlocked position out of engagement with the at least one aperture or notch in the lower rail, a memory member carried by the lower rail of one of the two slides and movable parallel thereto by engagement with an engagement member carried by the upper rail of the same slide, a latch operable to disengage the engagement member from the memory member and to move the trigger out of engagement with the associated lower rail to allow forward movement of the upper rail and seat thereon, the memory member remaining in position on the lower rail characterized in that the upper rail is provided with a pawl which holds the engagement member in the position where the trigger is disengaged from the lower rail while the upper rail is moved forwardly and the memory member comprises a front surface, a ramp surface and a slot engageable by the engagement member in the form of a pin, whereby on rearward movement of the upper rail, the pawl engages the front surface and releases the pin which is moved along the ramp surface and into the slot.

2. A vehicle seat slide mechanism according to claim 1 characterized in that the biasing means comprises a spring.

3. A vehicle seat slide mechanism according to claim 1 characterized in that on said rearward movement of the upper rail the pawl releases the engagement member in the form of a pin allowing the trigger to return to the locked position.

4. A vehicle seat comprising two seat slides, each consisting of an upper rail and a lower rail associated therewith and adapted to be connected to the vehicle floor, each upper rail being capable of movement in a fore-and-aft direction relative to the associated lower rail, a trigger mounted on at least one upper rail and normally urged by biasing means into a locked position in engagement with at least one of a series of apertures or notches in the associated lower rail to prevent relative movement of the upper rail with respect to the lower rail, a release member cooperating with the trigger and arranged to move the trigger from the locked position to an unlocked position out of engagement with the at least one aperture or notch in the lower rail, a memory member carried by the lower rail of one of the two slides and movable parallel thereto by engagement with an engagement member carried by the upper rail of the same slide, a latch operable to disengage the engagement member from the memory member and to move the trigger out of engagement with the associated lower rail to allow forward movement of the upper rail and seat thereon, the memory member remaining in position on the lower rail characterized in that the upper rail is provided with a pawl which holds the engagement member in the position where the trigger is disengaged from the lower rail while the upper rail is moved forwardly and the memory member comprises a front surface, a ramp surface and a slot engageable by the engagement member in the form of a pin, whereby on rearward movement of the upper rail, the pawl engages the front surface and releases the pin which is moved along the ramp surface and into the slot.

5. A vehicle seat further comprising a squab having a cam which is engageable with the latch.

6. A vehicle seat according to claim 5 characterized in that the latch is linked to a plate on the other of the two slides and which also carries an engagement member in the form of a pin, movement of the squab in a forward direction operating the latch and the plate linked thereto to cause the two pins to move respective triggers, one on each slide, out of engagement with the two lower rails.

7. A vehicle seat according to claim 6 characterized in that the memory member is in the form of a block frictionally engaged with but slidable on the lower rail, the pin on the latch normally being engaged in the slot in the block to cause it to move with the upper rail so long as the seat squab is not tilted forwardly.

8. A vehicle seat according to claim 7 characterized in that forward tilting of the squab causes the pin to move out of the slot and the member remains in position until re-engaged by the pawl.

* * * * *